(12) United States Patent
Tung

(10) Patent No.: US 6,318,491 B1
(45) Date of Patent: Nov. 20, 2001

(54) DRIVING BRAKE ASSEMBLY OF SCOOTER

(76) Inventor: Ko Chen Tung, No. 70, Lane 26, Chungyi 3 Rd., Dajia Jen, Taichung 437 (TW)

( * ) Notice: Subject to any disclaimer, the term of this patent is extended or adjusted under 35 U.S.C. 154(b) by 0 days.

(21) Appl. No.: 09/809,176

(22) Filed: Mar. 16, 2001

(51) Int. Cl.⁷ .................................................. B62D 61/00
(52) U.S. Cl. .................... 180/180; 180/220; 180/221; 188/29
(58) Field of Search ..................... 180/180, 181, 180/220, 221, 342; 280/87.021, 87.041, 87.042; 188/19, 29

(56) References Cited

U.S. PATENT DOCUMENTS

| | | | | |
|---|---|---|---|---|
| 2,460,395 | * | 2/1949 | Reid | 280/87.041 |
| 5,491,390 | * | 2/1996 | McGreen | 180/221 X |
| 5,775,452 | * | 7/1998 | Patmont | 180/87.041 X |
| 5,778,998 | * | 7/1998 | Shih | 180/221 |
| 5,816,355 | * | 10/1998 | Battlogg et al. | 180/221 |
| 6,227,324 | * | 5/2001 | Sauve | 180/221 |

* cited by examiner

*Primary Examiner*—Michael Mar
(74) *Attorney, Agent, or Firm*—Rosenberg, Klein & Lee

(57) ABSTRACT

A driving brake assembly of a scooter includes a connecting bracket secured to a frame and having two sides each provided with an ear plate for pivoting a wheel; a base pivotally mounted on the connecting bracket and having a first end formed with a front pedal, and a second end formed with a rear pedal, a wheel protecting slot defined in the base for receiving the wheel, a brake pad formed on the base to pivot with the base to press the wheel; an elastic member mounted between the base and the connecting bracket; a driver secured on the base and including a rotatable friction wheel pivoted with the base to press the wheel for driving the wheel to rotate; and a microswitch mounted on the base and connected to the driver for starting and stopping operation of the driver.

5 Claims, 6 Drawing Sheets

DRIVING BRAKE ASSEMBLY OF SCOOTER

BACKGROUND OF THE INVENTION

1. Field of the Invention

The present invention relates to a driving brake assembly of a scooter, and more particularly to a driving brake assembly whose base can be stepped by a single foot of the user to control the driver to drive the wheel to rotate or control the brake pad to stop rotation of the wheel.

2. Description of the Related Prior Art

A conventional scooter in accordance with the prior art comprises a drive mechanism for driving the scooter to move, and a brake mechanism for stopping movement of the scooter. However, the drive mechanism and the brake mechanism are respectively mounted on the frame of the scooter at two different positions, so that the user has to shift his foot between two different positions to tread the drive mechanism for driving the scooter to move, or the brake mechanism for stopping movement of the scooter, thereby affecting the balance of the user's body, so that the user easily falls down, thereby causing danger to the user. In addition, the driver of the conventional scooter is directly in contact with the wheel of the scooter to supply power to rotate the wheel, so that when the scooter is sliding without using the power, the driver is also rested and rotated by the rotating wheel such that the driver is easily worn out during long-term utilization, thereby reducing the lifetime of the driver.

SUMMARY OF THE INVENTION

In accordance with the present invention, there is provided a driving brake assembly of a scooter comprising:

a connecting bracket secured to a rear end of a frame and having two sides each provided with an ear plate for pivoting a wheel;

a base pivotally mounted on the connecting bracket by a shaft, and having a first end formed with a front pedal directed toward the frame, and a second end formed with a rear pedal, a wheel protecting slot defined in the base and located under the rear pedal for receiving the wheel therein, a brake pad formed on the base to pivot with the base to press an outer rim of the wheel;

an elastic member mounted between the base and the connecting bracket;

a driver secured on the base and including a rotatable friction wheel pivoted with the base to press the outer rim of the wheel for driving the wheel to rotate; and a microswitch mounted on the base and connected to the driver for starting and stopping operation of the driver.

The driver is secured on a first side of the base, and the driving brake assembly further comprises a counterweight mounted on a second side of the base for balancing a weight of the driver.

The elastic member is an inverted L-shaped elastic plate, and has a first end secured on the frame and a second end inserted in the base.

The front pedal of the base defines a locking groove for securing one end of the elastic member.

The brake pad of the base has one side formed with a brake sheet directed toward the wheel to press the outer rim of the wheel.

Further benefits and advantages of the present invention will become apparent after a careful reading of the detailed description with appropriate reference to the accompanying drawings.

DETAILED DESCRIPTION OF THE INVENTION

Figure 1:
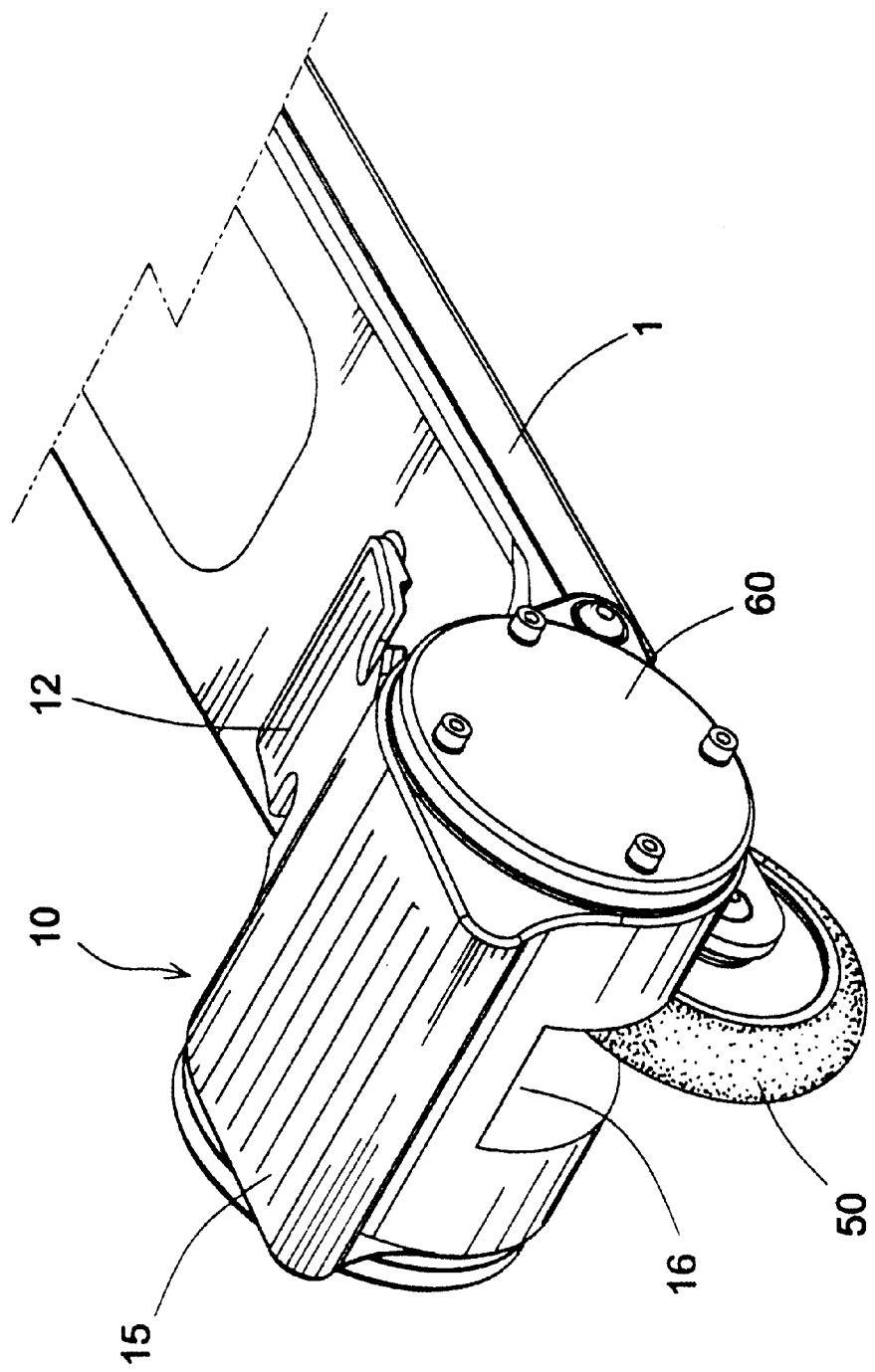
FIG. 1 is a perspective view of a driving brake assembly of a scooter in accordance with the present invention.
Figure 2:
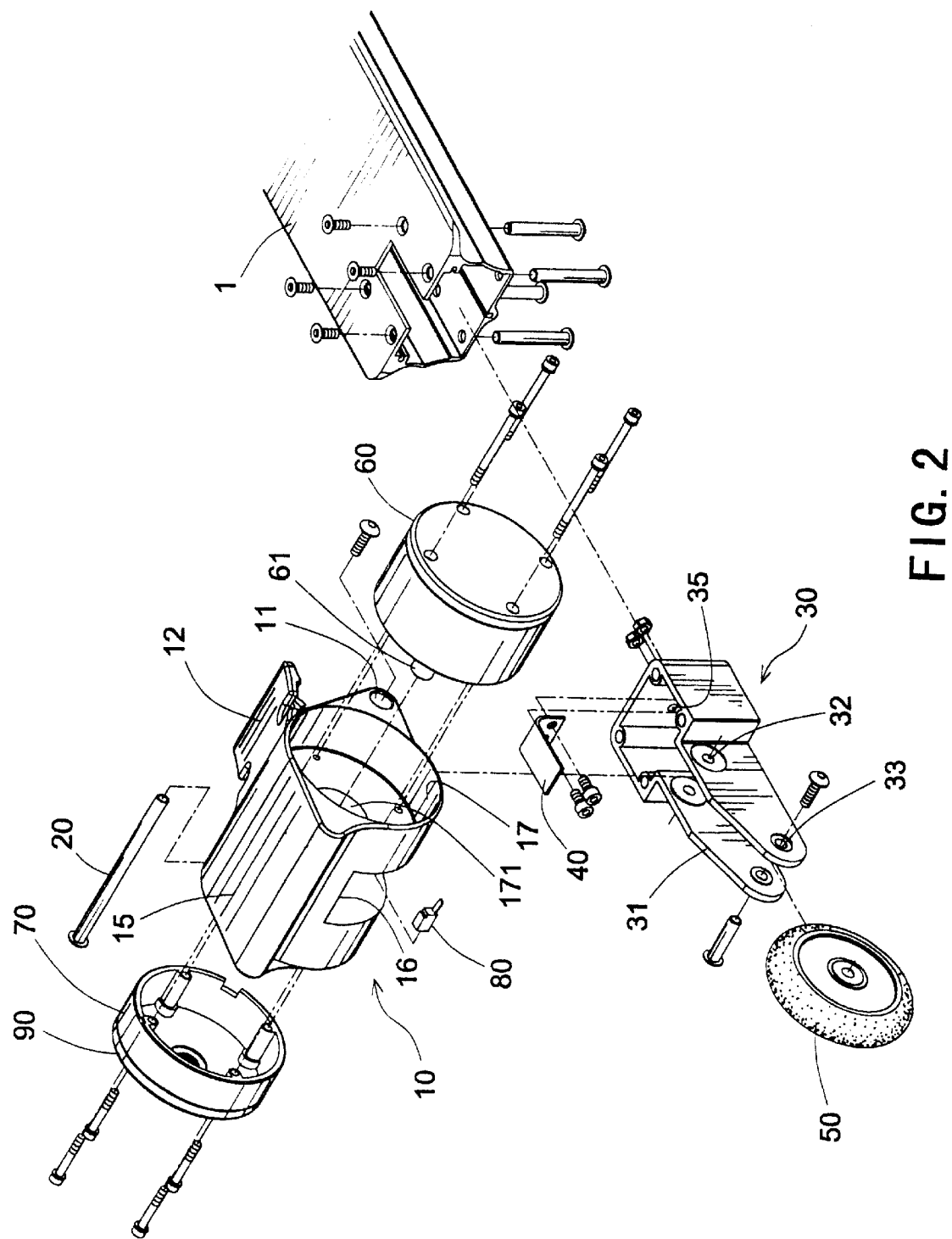
FIG. 2 is an exploded perspective view of the driving brake assembly of a scooter as shown in FIG. 1.
Figure 3:
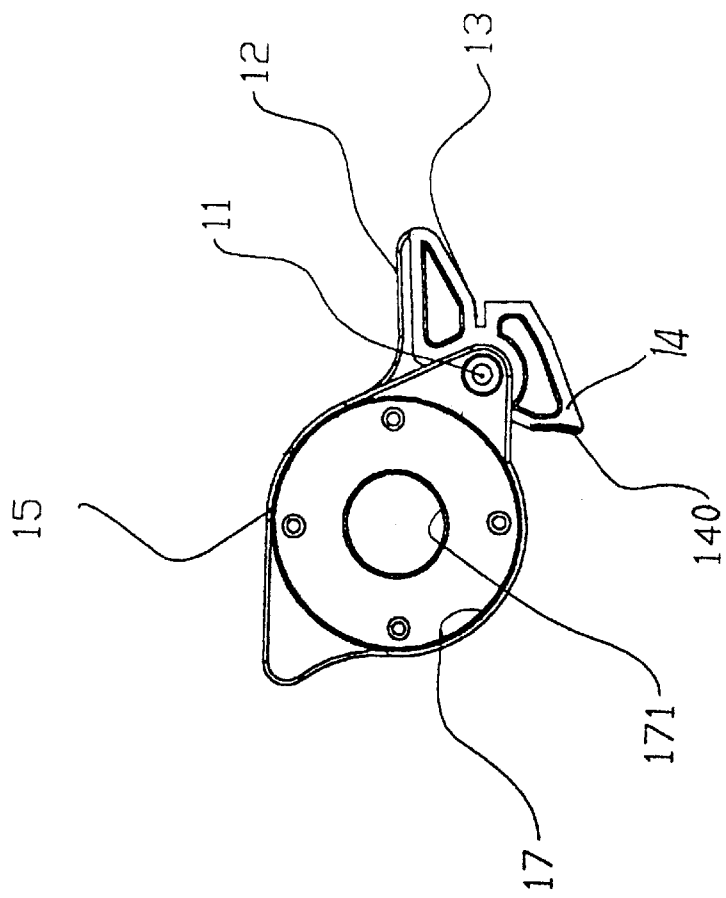
FIG. 3 is a side plan view of a base of the driving brake assembly of a scooter as shown in FIG. 1.
Figure 4:
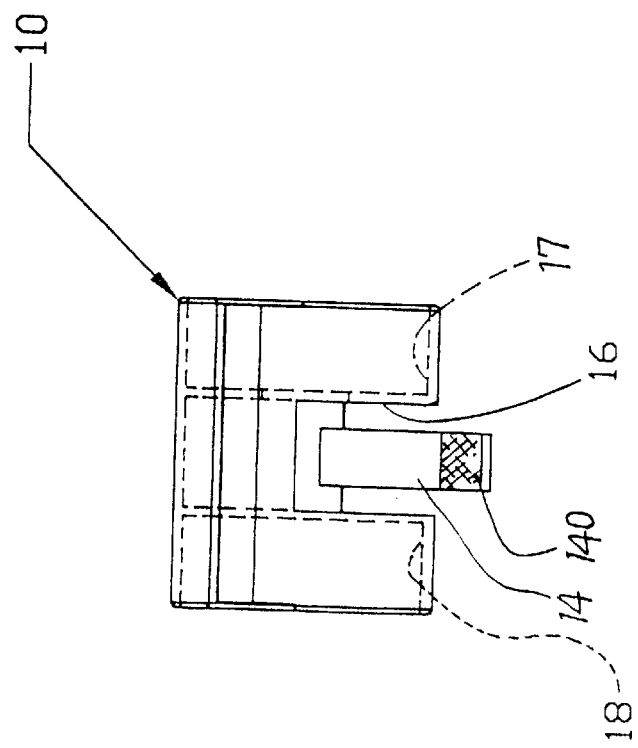
FIG. 4 is a rear plan view of a base of the driving brake assembly of a scooter as shown in FIG. 1.

Referring to the drawings and initially to FIGS. 1–4, a driving brake assembly of a scooter in accordance with the present invention primarily comprises a base 10, a connecting bracket 30, an elastic member 40, a driver 60, a counterweight 70, and a microswitch 80.

The connecting bracket 30 is secured to the rear end of the frame 1 of the scooter and has two sides each provided with an ear plate 31 defining a wheel hole 33 for pivoting a wheel 50 therebetween.

The base 10 is pivotally mounted on the connecting bracket 30 by a shaft 20. The base 10 ha two side walls each defining an axial hole 11. Each of the two ear plates 31 of the connecting bracket 30 defines an axial hole 32. The shaft 20 in turn extends through the axial holes 11 of the base 10 and the axial holes 32 of the connecting bracket 30, such that the base 10 is pivoted on the connecting bracket 30.

The base 10 has a first end formed with a front pedal 12 directed toward the frame 1, and a second end formed with a rear pedal 15. A wheel protecting slot 16 located under the rear pedal 15 is defined in the base 10 for receiving the wheel 50 therein. A brake pad 14 is formed on the base 10 to pivot with the base 10 to press the outer rim of the wheel 50. The brake pad 14 of the base 10 has one side formed with a replaceable brake sheet 140 directed toward the wheel 50 to press the outer rim of the wheel 50. A clearance is defined between the brake sheet 140 and the outer rim of the wheel 50 at the normal state.

The elastic member 40 is mounted between the base 10 and the connecting bracket 30. The elastic member 40 is an inverted L-shaped elastic plate, and has a first end secured on the connecting bracket 30 and a second end inserted in the base 10. The connecting bracket 30 defines two through holes 35 for locking the elastic member 40 by screws. The front pedal 12 of the base 10 defines a locking groove 13 for securing one end of the elastic member 40.

The driver 60 is secured on the base 10 and includes a rotatable friction wheel 61 pivoted with the base 10 to press the outer rim of the wheel 50 for driving the wheel 50 to rotate. The driver 60 is secured on a first side of the base 10. A counterweight 70 is mounted on a second side of the base 10 for balancing the weight of the driver 60, and is cover by a cover 90. The first side of the base 10 defines a receiving chamber 17 for receiving the driver 60, and the second side of the base 10 defines an insertion hole 18 for receiving the counterweight 70. The receiving chamber 17 of the base 10 defines a through hole 171 for receiving the friction wheel 61 of the driver 60. The through hole 171 communicates with the wheel protecting slot 16 such that the friction wheel 61 can be extended into the wheel protecting slot 16 and can be moved to press the outer rim of the wheel 50 for rotating the wheel 50.

The microswitch 80 is secured in the insertion hole 18 of the base 10, and is electrically connected to the driver 60 to start and stop operation of the driver 60. When the rear pedal 15 of the base 10 is pressed downward, the microswitch 80 is turned on to drive the driver 60 to rotate the friction wheel 61.

Figure 5:
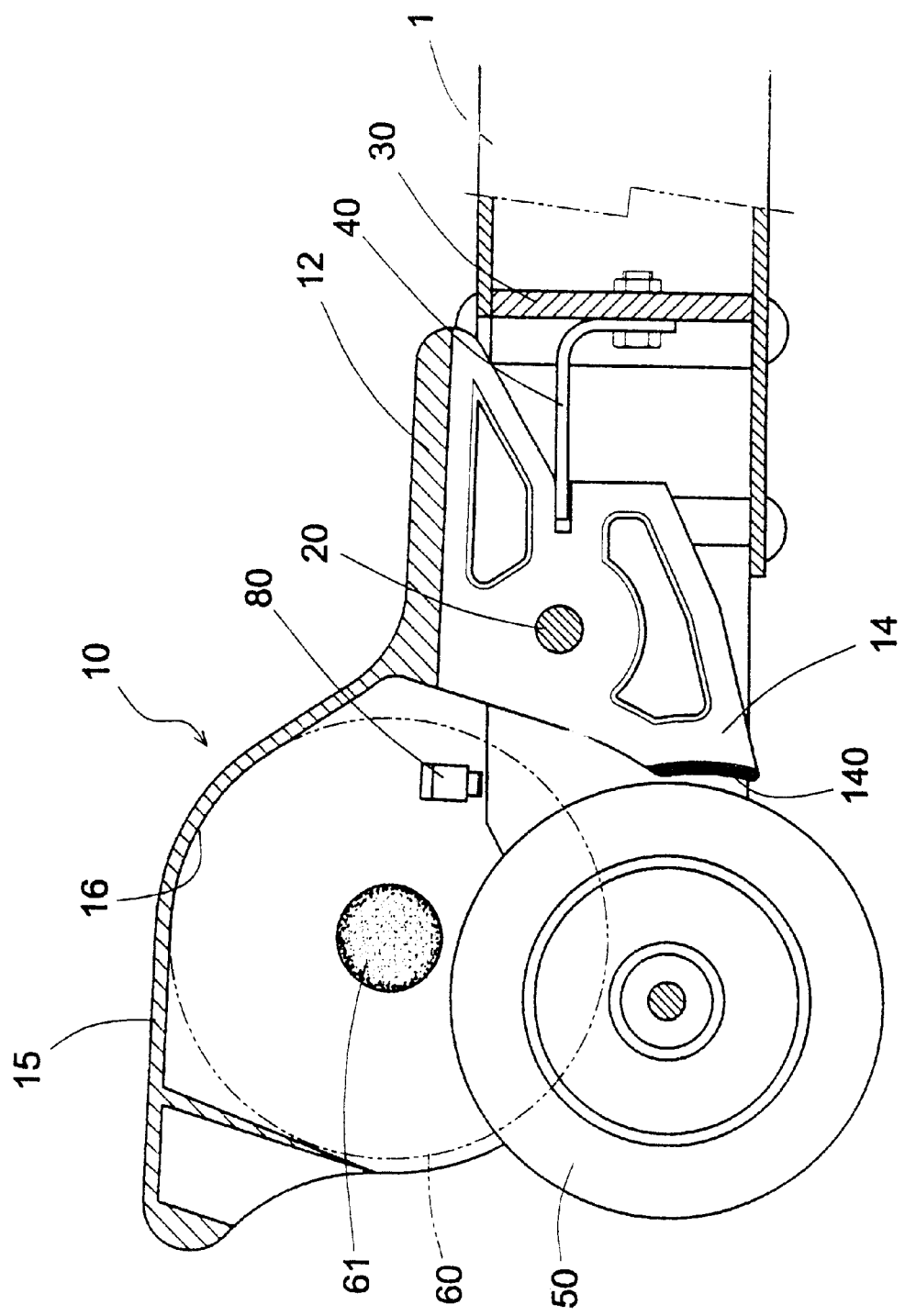
FIG. 5 is a side plan cross-sectional view of the driving brake assembly of a scooter as shown in FIG. 1.

In operation, referring to FIG. 5, the brake pad 14 is initially not in contact with the wheel 50. Meanwhile, the driver 60 is disposed at a closed state, such that the friction wheel 61 is also not in contact with the wheel 50. Thus, the wheel 50 can be rotated freely so that the scooter can be moved without power.

Figure 6:
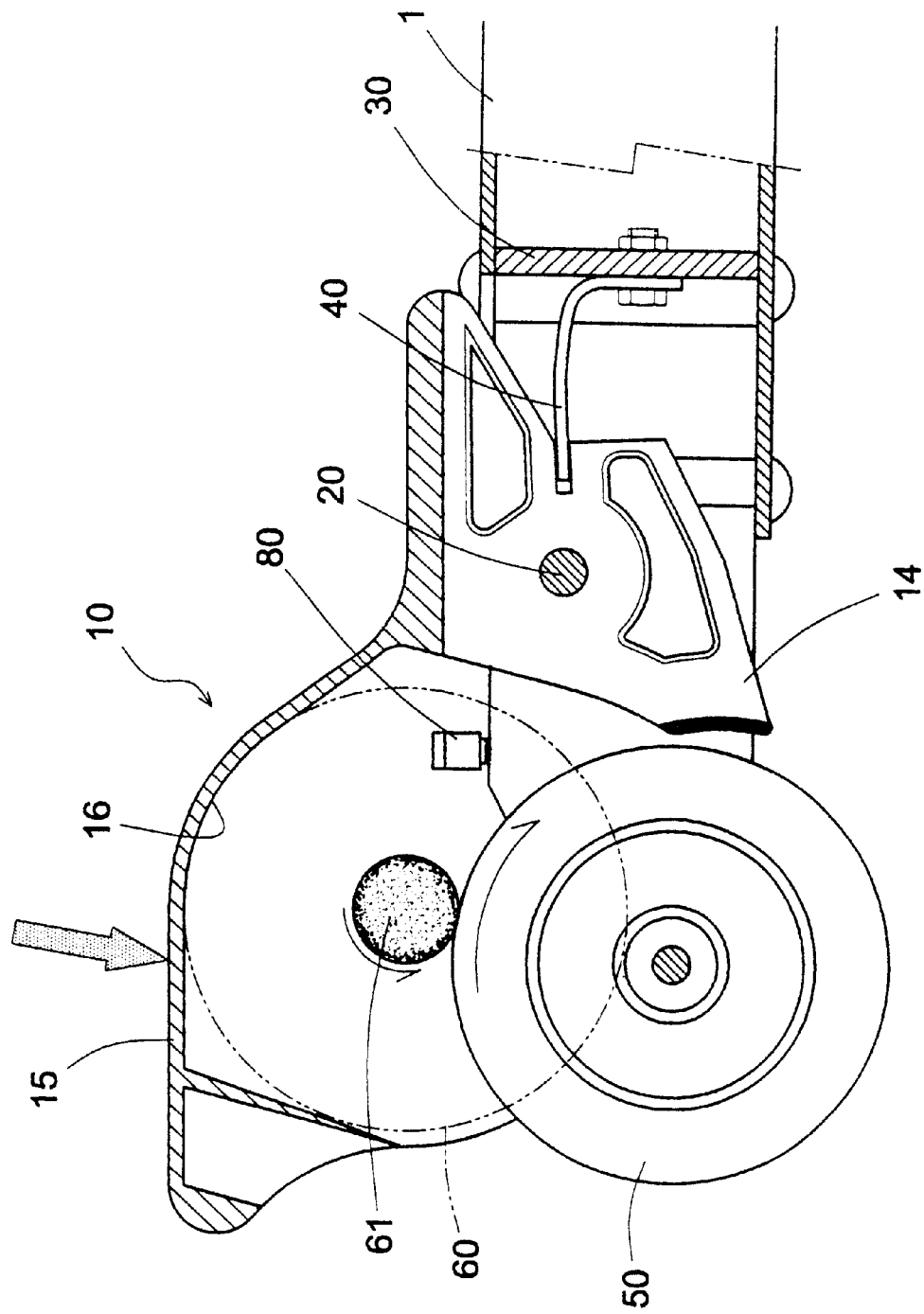
FIG. 6 is a schematic operational view of the driving brake assembly of a scooter as shown in FIG. 5 in use.

Referring to FIG. 6, the rear pedal 15 of the base 10 is treaded by the foot of the user so that the base 10 can be pivoted about the shaft 20, to move the friction wheel 61 to rest and press the outer rim of the wheel 50, while the microswitch 80 is pressed to start the driver 60 to rotate the friction wheel 61, thereby rotating the wheel 50, such that the scooter can be moved forward by the power supplied from the driver 60.

Figure 7:
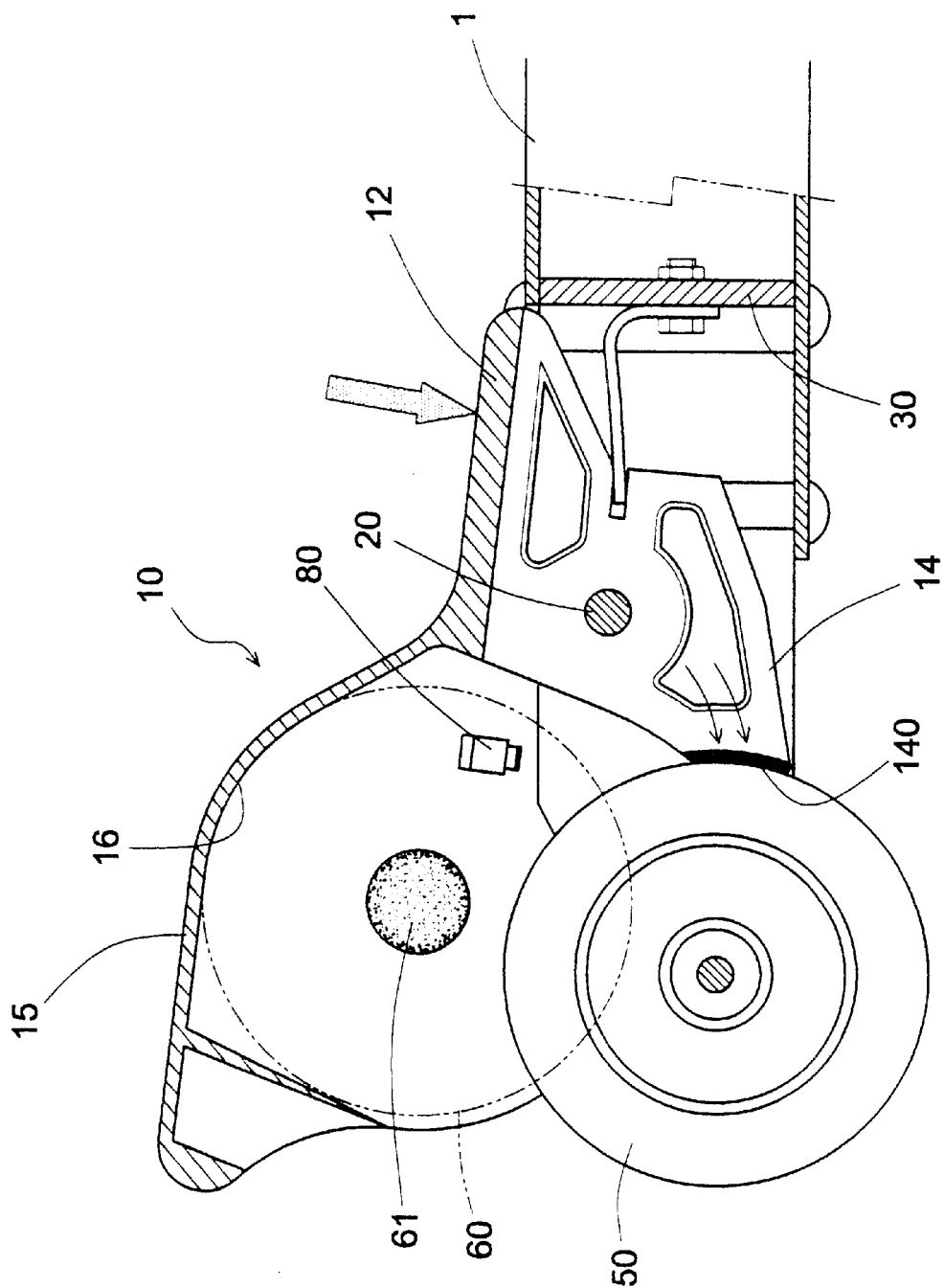
FIG. 7 is a schematic operational view of the driving brake assembly of a scooter as shown in FIG. 5.

Referring to FIG. 7, the front pedal 12 of the base 10 is treaded by the foot of the user so that the base 10 can be pivoted about the shaft 20 in a reverse direction, while the rear pedal 15 of the base 10 is lifted to release the pressure applied on the microswitch 80, thereby closing the operation of the driver 60. Meanwhile, the friction wheel 61 of the driver 60 is spaced from the outer rim of the wheel 50, thereby forming a clearance therebetween, so that the power for rotating the wheel 50 is removed. At the same time, the brake sheet 140 of the brake pad 14 of the base 10 is moved to press the outer rim of the wheel 50 so as to stop rotation of the wheel 50, thereby braking the scooter.

Accordingly, the base can be stepped by the single foot of the user to control the driver to drive the wheel to rotate or control the brake pad to stop rotation of the wheel. Thus, the driving brake assembly in accordance with the present invention can be operated conveniently and safely.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A driving brake assembly of a scooter comprising:
   a connecting bracket (30) secured to a rear end of a frame (1) and having two sides each provided with an ear plate (31) for rotably supporting wheel (50) therebetween;
   a base (10) pivotally mounted on said connecting bracket (30) by a shaft (20), and having a first end formed with a front pedal (12) directed toward said frame (1) for pivoting said base in a first direction, and a second end formed with a rear pedal (15) for pivoting said base in an opposite direction, a wheel protecting slot (16) defined in said base (10) and located under said rear pedal (15) for receiving said wheel (50) therein, a brake pad (14) formed on said base (10) to pivot with said base (10) when said front pedal is depressed to press said brake pad against an outer rim of said wheel (50);
   an elastic member (40) mounted between said base (10) and said connecting bracket (30);
   a driver (60) secured on said base (10) and including a rotatable friction wheel (61) pivoted with said base (10) when said rear pedal is depressed to press said friction wheel against said outer rim of said wheel (50) for rotatably driving said wheel (50); and
   a microswitch (80) mounted on said base (10) and connected to said driver (60) for starting and stopping operation of said driver (60) when said rear pedal is depressed.

2. The driving brake assembly of a scooter in accordance with claim 1, wherein said driver (60) is secured on a first side of said base (10), and said driving brake assembly further comprises a counterweight (70) mounted on a second side of said base (10) for balancing a weight of said driver (60).

3. The driving brake assembly of a scooter in accordance with claim 1, wherein said elastic member (40) is an inverted L-shaped elastic plate, and has a first end secured on said connecting bracket (30) and a second end inserted in said base (10).

4. The driving brake assembly of a scooter in accordance with claim 3, wherein said front pedal (12) of said base (10) defines a locking groove (13) for securing one end of said elastic member (40).

5. The driving brake assembly of a scooter in accordance with claim 1, wherein said brake pad (14) of said base (10) has one side formed with a brake sheet (140) directed toward said wheel (50) to press said outer rim of said wheel (50).

* * * * *